United States Patent [19]
Emerson

[11] 3,781,605
[45] Dec. 25, 1973

[54] DC SIGNAL PROCESSING CIRCUIT

[75] Inventor: Lucian F. Emerson, Williamsport, Pa.

[73] Assignee: GTE Laboratories Incorporated, Waltham, Mass.

[22] Filed: Dec. 4, 1972

[21] Appl. No.: 311,928

[52] U.S. Cl. .................... 317/5, 323/100, 330/69
[51] Int. Cl. ..................... G01p 3/42, B60t 8/12
[58] Field of Search ................. 318/678; 323/16, 323/19, 100; 330/30 D, 69; 317/5

[56] References Cited
UNITED STATES PATENTS

| | | | |
|---|---|---|---|
| 3,608,979 | 9/1971 | Coyle | 317/5 UX |
| 3,715,006 | 2/1973 | Walsh et al. | 317/5 X |
| 3,639,824 | 2/1972 | Malavasi | 323/19 |
| 3,155,917 | 11/1964 | Gelles | 330/69 X |
| 3,080,531 | 3/1963 | Koppel et al. | 330/69 |
| 3,550,117 | 12/1970 | Smith | 323/19 UX |
| 3,577,090 | 5/1971 | Montgomery | 330/69 |

*Primary Examiner*—A. D. Pellinen
*Attorney*—Irving M. Kriegsman et al.

[57] ABSTRACT

A dc signal processing circuit suitable for use in electronic control module for an automatic anti-skid braking system for vehicles such as automobiles. The processing circuit includes a differentiator-amplifier and comparator subcircuits. The differentiator subcircuit has applied an amplitude-varying dc "voltage" in direct proportion to the rotational velocity of the rear wheels. Instantaneous increases and decreases in the voltage level of the dc "velocity" voltage signal are detected by the differentiator-amplifier subcircuit to produce positive-going and negative-going pulses, respectively, amplified, and inverted thereby. These signals are applied to the camparator subcircuit where the positive-going pulses are compared with a dc "deceleration" reference voltage level having a value corresponding to a predetermined value of wheel deceleration. If the amplitude of a positive-going pulse exceeds the value of the constant dc "deceleration" reference voltage level, an output pulse is produced by the comparator subcircuit to effect operation of the brake-control mechanism of the vehicle to release the brakes and allow the wheels to spin up.

5 Claims, 1 Drawing Figure

PATENTED DEC 25 1973
3,781,605
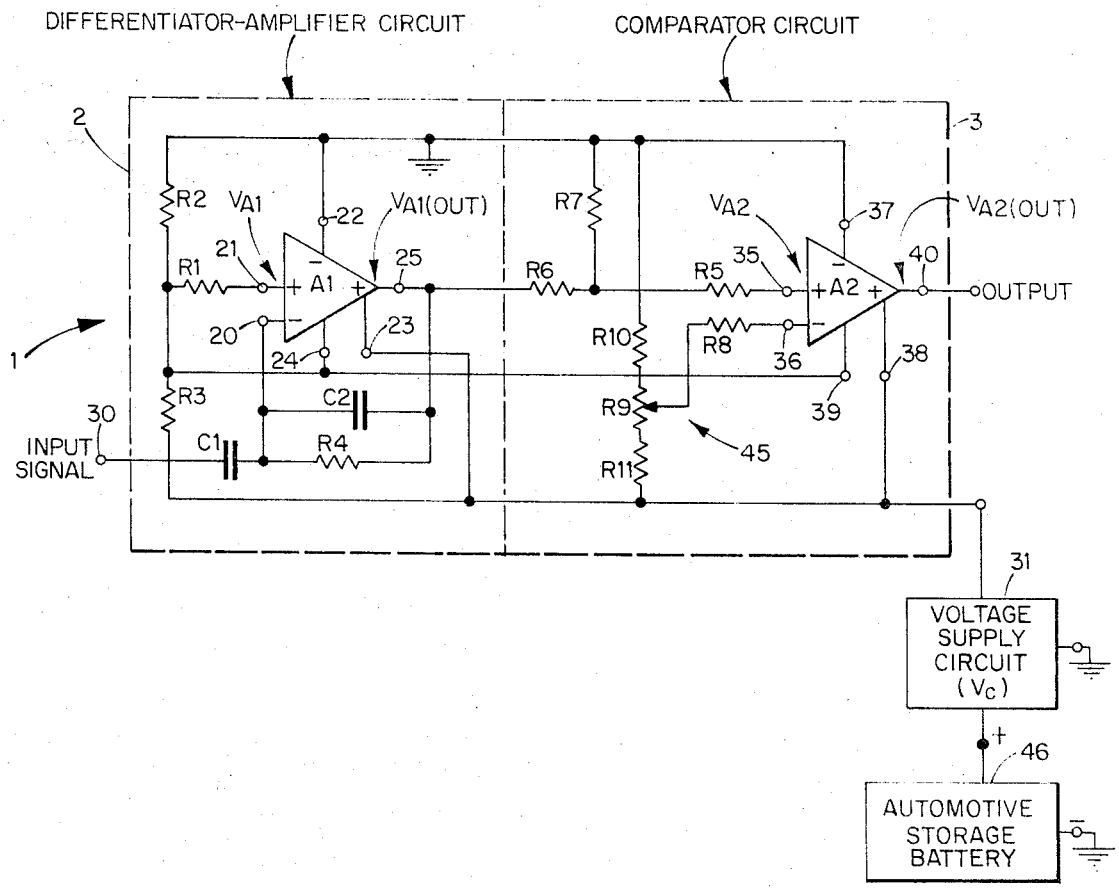

3,781,605

DC SIGNAL PROCESSING CIRCUIT

BACKGROUND OF THE INVENTION

The present invention relates to a signal processing circuit and, more particularly, to a dc signal processing circuit which is particularly suitable for use in an electronic control module for an automatic anti-skid braking system for vehicles such as automobiles.

It is often desirable in an automatic anti-skid braking system to determine when the wheel deceleration of a vehicle being braked, for example, during so-called "panic" braking, has reached a predetermined value indicating the imminence of a wheel lock-up situation and to use this information for effecting operation of the brake control mechanism of the vehicle to stabilize the vehicle and bring the vehicle safely under control within a reasonably short stopping distance. An automatic anti-skid braking system in which the above type of determination is particularly useful is described in detail in a co-pending patent application of Allen F. Hillman, Jr., Ser. No. 311,927, filed concurrently herewith, entitled "Electronic Control Module for Anti-Skid Braking Systems," and assigned to the same assignee as the present application.

As described in the abovementioned application, when a vehicle equipped with an electronic anti-skid module is put in motion, a velocity-sensing assembly associated with the vehicle operates to produce a pulse train having a frequency varying in direct proportion to the rotational velocity of the rear wheels. The varying-frequency pulse train is converted to an amplitude-varying dc "velocity" volage signal, also directly proportional to the rotational velocity of the rear wheels, and applied to a dc signal processing circuit including a differentiator-amplifier circuit and a comparator circuit. Instantaneous increases and decreases in the voltage level of the dc "velocity" voltage signal are detected by the differentiator-amplifier circuit to produce positive-going and negative-going pulses, respectively, amplified and inverted thereby, and the positive-going pulses so produced are compared with a dc "deceleration" reference voltage level having a value corresponding to a predetermined value of wheel deceleration existing during braking of a vehicle and indicating the imminence of a skidding or wheel lock-up situation. If the amplitude of a positive-going pulse exceeds the value of the constant dc "deceleration" reference voltage level, and output pulse is produced by the comparator circuit to effect operation of the brake-control mechanism of the vehicle to release the brakes and allow the wheels to spin up.

As mentioned in the above application, the above-described dc signal processing circuit may be implemented by a variety of conventional circuits well known to those skilled in the art. The present invention, however, contemplates a particularly novel implementation of a dc signal processing circuit which includes linear differential amplifiers connected in such a fashion as to avoid the necessity for costly center-tapped bi-polar power supplies ordinarily required for biasing linear differential amplifiers and which furthermore enables output control pulses to be produced by the dc signal processing circuit relative to ground potential rather than with respect to some other voltage level.

BRIEF SUMMARY OF THE INVENTION

In accordance with the present invention, a signal processing circuit is provided which ovecomes the disadvantages associated with prior art arrangements such as described hereinabove. The signal processing circuit of the invention includes a voltage supply means and first and second differential amplifier circuit means. The voltage supply means has a first terminal and a second terminal and is operative to supply a voltage signal to the first terminal. The second terminal of the voltage supply means is connected to a source of reference potential, for example, ground potential. The first and second differential amplifier circuit means each have a first input terminal, a second input terminal, a first bias terminal, a second bias terminal, a common-point terminal and an output terminal. Various means are provided for coupling the first bias terminals of the two differential amplifier circuit means to the source of reference potential and for coupling the second bias terminals of the two differential amplifier circuit means to the first terminal of the voltage supply means.

The signal processing circuit also includes first and second means connected in series between the first terminal of the voltage supply means and the source of reference potential and coupled at the juncture therebetween to the first input terminal of the first differential amplifier circuit means. The common-point terminals of the two differential amplifier circuit means are also coupled to this juncture between the first and second means. The first and second means are operative to couple a voltage signal to the first input terminal of the first differential amplifier circuit means having a value realted to the value of the voltage signal supplied by the voltage supply means at its first terminal. Additional voltage signals are established at the second input terminal of the first differential amplifier circuit means by a third means. The third means is coupled to an input signal terminal at which an ampltude-varying input signal is received and operates to produce and apply to the second input terminal of the differential amplifier circuit means voltage signals corresponding to changes in a first direction in the value of the amplitude-varying input signal. The first differential amplifier circuit means operates in response to the voltage signal at its first input terminal and each voltage signal at its second input terminal to produce an amplified voltage signal at its output terminal having a value realted to the difference between the value of the voltage signal at its first input terminal and the value of the voltage signal at its second input terminal.

The signal processing circuit further includes a sourth means which is operative to couple a voltage signal to th first input terminal of the second differential amplifier circuit means having a value realted to the value of the output signal produced at the output terminal of the first differential amplifier circuit means. A reference means operates to supply a reference voltage signal to the second input terminal of the second differential amplifier circuit means. The second differential amplifier circuit means operates to compare the values of the voltage signals applied to its first and second input terminals and to produce an output voltage signal at its output terminal in response to the value of the voltage signal at its first input terminal bearing a predetermined relationship to (for example, exceeding) the value of the reference voltage signal at its second input terminal.

BRIEF DESCRIPTION OF THE DRAWING

The single FIGURE illustrates in schematic diagram form a dc signal processing circuit including a differentiator-amplifier circuit and a comparator circuit in accordance with the present invention.

GENERAL DESCRIPTION

Referring now to the figure, there is shown a dc signal processing circuit 1 including a differentiator-amplifier circuit 2 and a comparator circuit 3. The differentiator-amplifier circuit 2 includes a linear differential amplifier A1, which may be one of several well-known commercially available operational amplifiers, and includes, in a conventional fashion, an inverting input terminal 20, a non-inverting input terminal 21, an inverting bias terminal 22, a non-inverting bias terminal 23, a common-point terminal 24, and an output terminal 25. As indicated in the figure, the inverting input terminal 20 is coupled to a signal-receiving input terminal 30 by means of a capacitor C1, and the non-inverting input terminal 21 is coupled by means of a coupling resistor R1 to the juncture of a pair of resistors R2 and R3. The remote end of the resistor R2 is directly connected to ground potential, for example, the chassis of a vehicle, and the remote end of the resistor R3 is connected directly to the positive terminal of a voltage supply circuit 31, the negative terminal of which is connected directly to ground potential. As is evident from the figure, the resistors R2 and R3 are arranged in a voltage-divider configuration.

In addition to the abovementioned connections, the inverting bias terminal 22 of the linear differential amplifier A1 is connected directly to ground potential, the non-inverting bias terminal 23 is connected directly to the positive terminal of the voltage supply circuit 31, and the common-point terminal 24 is directly connected to the juncture of the voltage divider resistors R2 and R3. Th desired value of gain of the linear differential amplifier A1 is achieved in a conventional manner by means of a feedback resistor R4 of appropriate value connected between the inverting input terminal 20 and the output terminal 25. Frequency stability of the linear differential amplifier A1 is achieved in a conventional manner by a capacitor C2 of appropriate value also connected between the inverting input terminal 20 and the output terminal 25.

The comparator circuit 3, like the differentiator-amplifier circuit 2, also includes a linear differential amplifier. As indicated in the figure, a second linear differential amplifier A2 is provided having a non-inverting input terminal 35, an inverting input terminal 36, an inverting bias terminal 37, a non-inverting bias terminal 38, a common-point terminal 39, and an output terminal 40. For most effective operation, it is desirable that the linear differential amplifier A2 be of the same design as the linear differential amplifier A1. The non-inverting input terminal 35 of the linear differential amplifier A2 is coupled to the output terminal 25 of the linear differential amplifier A1 via a pair of series-connected resistors R5 and R6. A resistor R7 is connected between the juncture of the resistors R5 and R6 and ground potential and forms a voltage divider with the resistor R6 for providing voltage overload protection for the linear differential amplifier A2. The resistor R5 serves as a current-limiting resistor.

The inverting input terminal 36 of the linear differential amplifier A2 is coupled by means of a current-limiting resistor R8 to a series resistive reference voltage-setting arrangement 45 including a variable resistor R9, a resistor R10 connected between one end of the variable resistor R9 and ground potential, and a resistor R11 connected between the other end of the variable resistor R9 and the positive terminal of the voltage supply circuit 31. The reference voltage-setting arrangement 45 serves to provide a dc reference voltage to the inverting input terminal 36 of the linear differential amplifier A2. In addition to the above connections, the inverting bias terminal 37 of the linear differential amplifier A2 is connected directly to ground potential, the non-inverting bias terminal 38 is connected directly to the positive terminal of the voltage supply circuit 31, and the common-point terminal 39, like the common-point terminal 24 of the linear differential amplifier A1, is connected directly to the juncture of the voltage-divider resistors R2 and R3. The output of the linear differential amplifier A2 is taken at the output terminal 40.

The voltage supply circuit 31 shown in the figure may be implemented by a variety of well-known circuits. However, a preferred form of the voltage supply circuit 31 for use in an automobile anti-skid braking system includes voltage regulating circuitry for converting the unregulated positive-voltage output of a standard 12-volt automobile battery 46, which voltage output may vary over a range of about 8-15 volts, to a lower, regulated value suitable for use with the linear differential amplifiers A1 and A2, for example 6.2-6.8 volts. A particularly suitable voltage regulating circuit which satisfies the above requirements is described in detail and claimed in a co-pending patent application of Lucian F. Emerson, Ser. No. 311,929, filed concurrently herewith, entitled "Voltage Regulating Circuit," and assigned to the same assignee as the present application.

As indicated hereinabove, the inverting bias terminal 22 of the lineae differential amplifier A1 and the inverting bias terminal 37 of the linear differential amplifier A2 are both connected directly to ground potential. Normally, such terminals are connected to a source of negative dc voltage while the non-inverting bias terminals are connected to a source of positive voltage. Thus, a bipolar voltage source is normally required. (The common-point terminals are normally connected to the mid-point of the positive and negative voltages). However, in accordance with the present invention, the inverting bias terminals 22 and 37 of the linear differential amplifiers A1 and A2 are connected directly to ground potential rather than to a negative voltage source. By so doing, the use of a center-tapped bi-polar voltage supply, which can often by costly and therefore economically unattractive when considered for use in a low cost anti-skid system for mass-produced automobiles, may be avoided, and, instead, the positive output voltage of the standard 12-volt storage battery already present in such automobiles may be used for deriving positive bias voltages for the non-inverting bias terminals 23 and 38 of the linear differential amplifiers A1 and A2. As a further consequence of the above connections, output signals which are produced by the linear differential amplifier A2 for controlling subsequent circuitry are produced with respect to ground potential rather than with respect to some voltage above or below ground potential, as would otherwise be the case, thereby avoiding the use of voltage-level shifting circuitry for deriving voltages relative to ground potential.

OPERATION

The dc signal processing circuit 1 of the figure operates in the following manner. IN the quiescent operating state of the dc signal processing circuit 1, that is, with no signal present at the input terminal 30, a positive input voltage signal $V_{A1}$ having a value relative to ground potential of $$R/R2 + R3 \; (V_c),$$

where $V_c$ is the value of the positive voltage from the voltage supply circuit 31, is present at the non-inverting input terminal 21 of the linear differential amplifier A1 due to the voltage divider action of the resistors R2 and R3. With the above input condition at the non-inverting input terminal 21, a positive output voltage signal $V_{A1(OUT)}$, having a value equal to $V_{A1}$, is presented by the linear differential amplifier A1 at the output terminal 25 and also to the inverting input terminal 20 by means of the feedback resistor R4. Accordingly, both of the input terminals 20 and 21 of the linear differential amplifier A1 are at the same voltage in the quiescent operating state.

The output voltage signal $V_{A1(OUT)}$ at the output terminal 25 of the linear differential amplifier A1 is applied to the voltage divider resistors R6 and R7, and a positive voltage signal $V_{A2}$, having a value relative to ground potential of $$R7/R6 + R7 \; V_{A1(OUT)},$$

is presented to the non-inverting input terminal 35 of the linear differential amplifier A2 due to the voltage divider action of the resistors R6 and R7. A positive dc reference voltage signal is applied by the resistive reference voltage-setting arrangement 45 to the inverting input terminal 36 of the linear differential amplifier A2. The value of the positive reference voltage signal applied to the inverting input terminal 36 during th quiescent operating state is established to be the same as the value of the voltage signal $V_{A2}$ present at the non-inverting input terminal 35. This is accomplished by appropriately controlling the value of the variable resistor R9. With both of the input terminals 35 and 36 at the same voltage, the linear differential amplifier A2, which is connected to operate as a differential voltage comparator, detects no difference between the two input voltage signals and, therefore, causes the voltage at the output terminal 40, designated $V_{A2(OUT)}$, to be at 0 volts.

The non-quiescent operating state of the dc signal processing circuit 1, that is, with an amplitude-varying dc voltage signal present at the input terminal 30, is as follows. The amplitude-varying dc voltage signal applied to the input terminal 30 is differentiated by the capacitor C1 to detect instantaneous changes in the amplitude of the dc voltage signal. A positive-going voltage spike is produced by the capacitor C1 in response to each increase in the level of the amplitude-varying dc voltage signal and a negative-going voltage spike is produced by the capacitor C1 in response to each decrease in the level of the dc voltage signal. The amplitude of each voltage spike produced by the capacitor C1 depends on the amount of change detected by the capacitor C1 and is directly related thereto. Each voltage spike produced by the capacitor C1 is applied to the inverting input terminal 20 of the linear differential amplifier A1.

As in the quiescent operating state of the dc signal processing circuit 1, a dc voltage signal $V_{A1}$, having a value relative to ground potential of $$R2/R2 + R3 \; (V_c),$$

is applied to the non-inverting input terminal 21 of the linear differential amplifier A1 by the voltage divider resistors R2 and R3, and also to the inverting input terminal 20 via the output terminal 25 and the feedback resistor R4. Since the bi-polar voltage spikes produced by the capacitor C1 ride on the dc voltage signal $V_{A1}$ present at the non-inverting input terminal 20, voltage differences are established between the input signals applied to the input terminals 20 and 21 and the linear differential amplifier A1 accordingly operates to amplify and invert the bi-polar voltage spikes applied to the inverting input terminal 20. The amplified and inverted bi-polar voltage spikes, designated $V_{A1(OUT)}$, are presented at the output terminal 25 of the linear differential amplifier A1.

Each output voltage spike presented at the output terminal 25 of the linear differential amplifier A1, $V_{A1(OUT)}$, is applied to the juncture of the voltage divider resistors R6 and R7 and a fractional portion thereof, equal to $$R7/R6 + R7 \; V_{A1(OUT)},$$

is applied to the non-inverting input terminal 35 of the linear differential amplifier A2. A positive dc reference voltage signal, of the same value as established for the quiescent operating state of the dc signal processing circuit 1, is applied to the inverting input terminal 36 by the resistive reference voltage-setting arrangement 45. The linear differential amplifier A1 operates to compare each positive-going voltage spike presented to the non-inverting input terminal 35 with the positive dc reference voltage signal and to produce a positive maximum-gain output pulse $V_{A2(OUT)}$, measured with respect to ground potential, when the value of a positive-going voltage spike at the non-inverting input terminal 35 exceeds the value of the positive dc reference voltage signal. No output pulse is produced for negative-going voltage spikes applied to the non-inverting input terminal 35 inasmuch as the inverting bias terminal 37 is at ground potential and, therefore, prevents negative-going voltage spikes from driving the linear differential amplifier A2. The output produced by the linear differential amplifier A2 in response to each negative-going voltage spike at the non-inverting input terminal 35 is thus at 0 volts. Each maximum-gain output voltage signal produced by the linear differential amplifier A2 at the output terminal 40 in response to a positive-going voltage spike presented to the non-inverting input terminal 35 is applied to subsequent circuitry for further processing.

Some typical values for the parameters of the components employed in the above described dc signal processing circuit 1 are as follows:

| | |
|---|---|
| A1, A2 | CA 3010 operational amplifiers (RCA) |
| C1 | 1.0 microfarad |
| C2 | 1.0 microfarad |
| R1 | 39 kilohms |
| R2 | 100 ohms |

| | |
|---|---|
| R3 | 100 ohms |
| R4 | 39 kilohms |
| R5 | 10 kilohms |
| R6 | 1 kilohm |
| R7 | 10 kilohms |
| R8 | 10 kilohms |
| R9 | 10 kilohms |
| R10 | 1 kilohm |
| R11 | 2.2 kilohms |
| $V_c$ | 6.2–6.8 volts |

While there has been shown and described what is considered a preferred embodimnt of the invention, it will be obvious to those skilled in the art that various change and modifications may be made therein without departing from the invention as defined by the appended claims.

What is claimed is:

1. A signal processing circuit for an automotive antiskid braking system comprising:

a source of reference potential providing a voltage signal at ground potential;

voltage supply means having a first terminal and a second terminal and operative to supply a voltage signal to the first terminal, said second terminal being connected to the source of reference potential, said supply means includes an automotive storage battery;

first differential amplifier circuit means having a first input terminal, a second input terminal, a first bias terminal, a second bias terminal, a common-point terminal, and an output terminal;

means for coupling the first bias terminal of the first differential amplifier circuit means to the source of reference potential;

means for coupling the second bias terminal of the first differential amplifier circuit means to the first terminal of the voltage supply means;

first and second resistors connected in series between the first terminal of the voltage supply means and the source of reference potential and coupled at the juncture therebetween to the first input terminal of the first differential amplifier circuit means, said first and second resistors being operative to couple a v'ltage signal to the first input terminal of the first differential amplifier circuit means having a value less than the value of the voltage signal supplied by the voltage supply means at its first terminal;

the common-point terminal of the first differential amplifier circuit means coupled to the juncture of the first and second resistors;

an input signal terminal for receiving an amplitude-varying input signal;

third means which includes a capacitance coupled to the input signal terminal and to the second input terminal of the first differential amplifier circuit means and operative in response to an amplitude-varying input signal received at the input signal terminal to produce and apply to the second input terminal of the first differential amplifier circuit means voltage signals corresponding to changes in a first direction in the value of tye amplitude-varying input signal;

said first differential amplifier circuit means being operative in response to the voltage signal at its first input terminal and each voltage signal at its second input terminal to produce an amplified output voltage signal at its output terminal having a value related to the difference between the value of th voltage signal at its first input terminal and the value of the voltage signal at its second input terminal;

second differential amplifier circuit means having a first input terminal, a second input terminal, a first bias terminal, a second bias terminal, a common-point terminal, and an output terminal;

means for coupling the first bias terminal of the second differential amplifier means to the source of reference potential;

means for coupling the second bias terminal of the second differential amplifier circuit means to the first terminal of the voltage supply means;

the common-point terminal of the second differential amplifier circuit means coupled to the juncture of the first and second resistors;

reference means operative to supply a reference voltage signal to the second input terminal of the second differential amplifier circuit means; and fourth means operative to couple a voltage signal to the first input terminal of the second differential amplifier circuit means having a value related to the value of the output signal produced at the output terminal of the first differential amplifier circuit means;

said fourth means includes a resistance connected in series between the output terminal of the first differential amplifier circuit means and the first input terminal of the second differential amplifier circuit means, and a resistance connected between the first input terminal of the second differential amplifier circuit means and the source of reference potential, said resistances coupling a voltage signal to the first input terminal of the second differential amplifier circuit means having a value less than the value of the output signal produced at the utput terminal of the first differential amplifier circuit means;

said second differential amplifier circuit means being operative to compare the value of the voltage signal applied to its first and second input terminals and to produce an output voltage signal at its output terminal in response to the value of the voltage signal at its first input terminal bearing a predetermined relationship to the value of the reference voltage signal at its second input terminal.

2. A signal processing circuit in accordance with claim 1 wherein:

the reference means includes a variable resistance coupled between the source of reference potential and the first terminal of the voltage supply means and to the second input terminal of the second differential amplifier circuit means.

3. A signal processing circuit in accordance with claim 1 wherein:

the second differential amplifier circuit means is operative to produce an output voltage signal at its output terminal in response to the value of the voltage signal at its first input terminal exceeding the value of the reference voltage signal at its second input terminal.

4. A signal processing circuit in accordance with claim 3 wherein:

the first input terminal of the first differential amplifier circuit means is a non-inverting input terminal, the second input terminal is an inverting inpu terminal, the first bias terminal is an inverting bias terminal, and the second bias terminal is a non-inverting bias terminal; and the first input terminal of the second differential amplifier circuit means is a non-inverting input terminal, the second input terminal is an inverting input terminal, the first bias terminal is an inverting bias terminal, and the second bias terminal is a non-inverting bias terminal.

5. A signal processing circuit in accordance with claim 4 further comprising:

feedback means coupled between the output terminal and the inverting input terminal of the first differential amplifier circuit means for achieving a particular value of gain for the first differential amplifier circuit means.

* * * * *

UNITED STATES PATENT OFFICE
CERTIFICATE OF CORRECTION

Patent No. 3,781,605                 Dated December 25, 1973

Inventor(s) Lucian F. Emerson

It is certified that error appears in the above-identified patent and that said Letters Patent are hereby corrected as shown below:

```
Column 1, line 6, change "akid" to --skid--;
Column 1, line 50, change "and" to --an--;
Column 2, line 35, change "realted" to --related--;
Column 2, line 50, change "realted" to --related--;
Column 2, line 54, change "sourth" to --fourth--;
Column 2, line 55, change "th" to --the--;
Column 2, line 56, change "realted" to --related--;
Column 3, line 42, change "Th" to --The--;
Column 4, line 42, change "lineae" to --linear--;
Column 4, line 56, change "by" to --be--;
Column 5, line 14, change "R/R2 + R3 (V_c)" to --R2/R2 + R3 (V_c)--
Column 5, line 42, change "th" to --the--;
Column 7, line 6, change "10" to --100--;
Column 7, line 42, change "v'ltage" to --voltage--;
Column 7, line 61, change "tye" to --the--;
Column 8, line 1, change "th" to --the--;
Column 8, line 36, change "utput" to --output--;
Column 8, line 66, change "inpu" to --input--.
```

Signed and sealed this 30th day of July 1974.

(SEAL)
Attest:

McCOY M. GIBSON, JR.          C. MARSHALL DANN
Attesting Officer             Commissioner of Patents